May 7, 1963  E. W. VAUGHAN  3,089,074
ADJUSTABLE VOLTAGE RECTIFIER
Filed March 18, 1960  2 Sheets-Sheet 1

INVENTOR.
Eric W. Vaughan
BY
Johnson and Kline
ATTORNEYS

May 7, 1963

E. W. VAUGHAN 3,089,074

ADJUSTABLE VOLTAGE RECTIFIER

Filed March 18, 1960

INVENTOR.
Eric W. Vaughan

BY

Johnson and Kline
ATTORNEYS

United States Patent Office
3,089,074
Patented May 7, 1963

3,089,074
ADJUSTABLE VOLTAGE RECTIFIER
Eric W. Vaughan, Bristol, Conn., assignor to The Superior Electric Company, Bristol, Conn., a corporation of Connecticut
Filed Mar. 18, 1960, Ser. No. 15,980
5 Claims. (Cl. 321—8)

The present invention relates to providing a D.C. voltage from an A.C. source and more particularly for enabling the value of the D.C. voltage to be adjusted.

An object of the present invention is to provide a rectifier for converting A.C. power into D.C. power with the A.C. power being derived for a three phase A.C. source and being adjustable prior to rectification to provide the adjustable D.C. voltage output.

Another object of the present invention is to achieve the above object with a minimum of power loss by full-wave rectification of the A.C. power with a minimum of distortion in the D.C. power.

A further object of the present invention is to accomplish the above objects with a rectifier that is free from complexity in design, relatively economical to fabricate by having a minimum number of parts, and which is efficient and durable in operation.

A feature of the present invention resides in structure that rectifies the A.C. power into D.C. with the D.C. power being substantially smooth by reason of its low ripple content and having a frequency that is many times that of the A.C. power. This is accomplished according to the present invention by providing three transformers, each having a primary and a secondary winding. A brush rides on the turns of the secondary winding so that movement of the brushes, in unison, provides an adjustable A.C. voltage. The primary windings are connected to a three phase A.C. source with each primary winding being energized from one of the phases. The output terminals at which the D.C. power output appears, each have three one-way valve means connected thereto, with the valve means of the terminlas being conductive in opposite direction. Connections connect the brushes to the one-way valve means and hence enable the D.C. voltage at the output terminals to be adjusted.

The present invention is shown in two distinct forms with each form having a different connection of the secondary windings and brushes to the one-way valve means. Thus, in one embodiment, the secondary windings are delta connected, while in the other embodiment of the invention the secondaries are Y connected to the rectifiers, the latter providing a higher maximum voltage and the former a higher maximum current.

A further feature of the present invention resides in mounting the adjustable transformers to be aligned vertically. A pair of parallel conducting bars are vertically mounted on the transformers and the rectifiers are mounted to be electrically connected thereto. The bars serve as the output terminals of the device and in addition serve as a "heat sink" to conduct heat away from the rectifiers, thereby providing a compact and efficient arrangement of the parts.

Other features and advantages will hereinafter appear.

Figure 1:
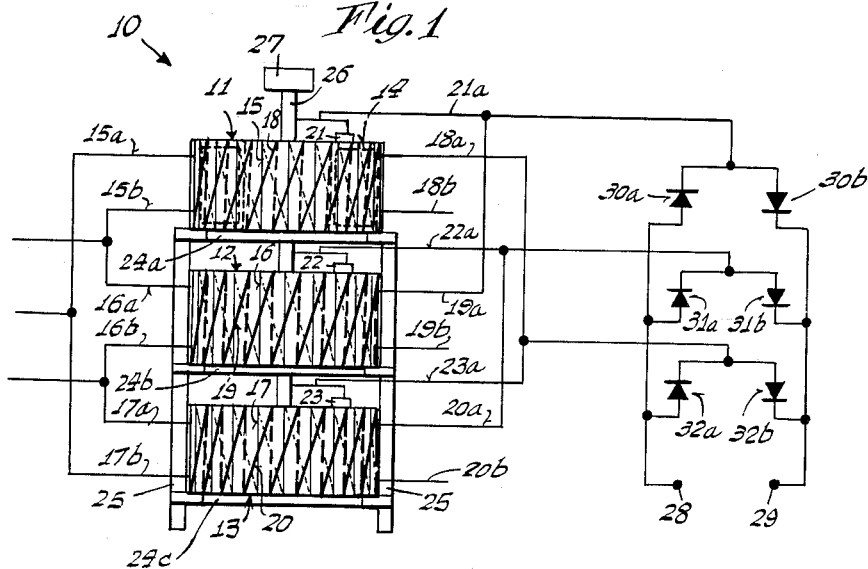
FIGURE 1 is a diagrammatic view of the components of the present invention.

Referring to the drawing, the adjustable voltage rectifier of the present invention is generally indicated by the reference numeral 10 and includes three transformers 11, 12 and 13. Each of the transformers includes an annular core 14 formed of a strip of paramagnetic material spirally wound and a length of conducting wire toroidally wound about the core to constitute the primary winding 15 for transformer 11, 16 for transformer 12 and 17 for transformer 13 with ends 15a, 15b, 16a, 16b, 17a and 17b respectively. Wound about the core and primary winding of each transformer is another length of conducting wire that forms a secondary winding 18 for transformer 11, 19 for transformer 12 and 20 for transformer 13 having ends 18a, 18b, 19a 19b, 20a and 20b respectively.

Figure 5:
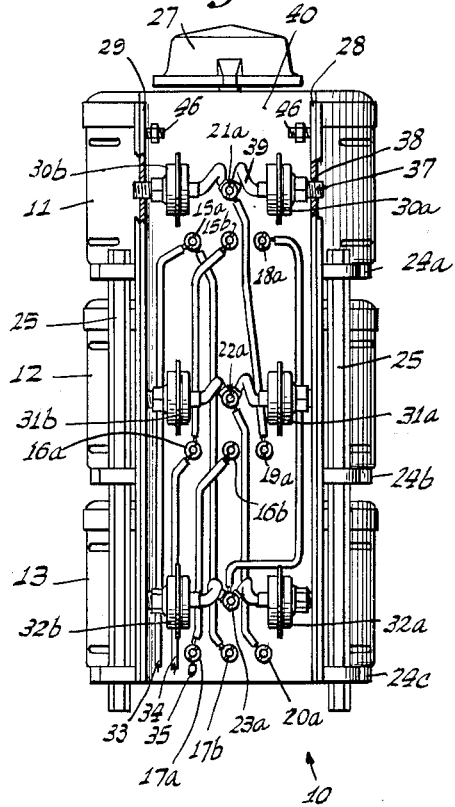
FIG. 5 is a front elevation thereof.

The secondary windings are each formed to provide an arcuate commutating surface as by milling, grinding or otherwise removing a similar chordal segment of each of the turns and brushes 21, 22 and 23 of transformers 15, 16 and 17 respectively ride in electrical engagement thereon to have electrical engagement with the turns, as is well known in the art, particularly in the adjustable voltage autotransformer art. Leads (which as shown in FIG. 5 are terminals) 21a, 22a and 23a are connected to the brushes 21, 22 and 23 respectively and extend from the transformers in a manner which is also well known in the autotransformer art.

As shown (FIGS. 4 and 5), the three transformers 11, 12 and 13 are mounted to be in alignment as by each being mounted on a base plate 24a, 24b and 24c with the base plates being maintained in vertical spaced relation by a plurality of upright legs 25.

In order to maintain the brushes moving in unison, while a plurality of interconnecting shafts or gears may be used, there is provided a shaft 26 which extends through the open centers of the transformers and to which each of the brushes is connected. The shaft 26 has a manual knob 27 for permitting movement of the brushes and hence adjusting of the D.C. output voltage though, of course, if desired it may be moved by a motor. Shown spaced from the transformers, though they are preferably secured thereto to form a unitary device is a pair of D.C. output terminals 28 and 29 having one-way valve means 30a and 30b, 31a and 31b and 32a and 32b connected thereto.

Figure 2:
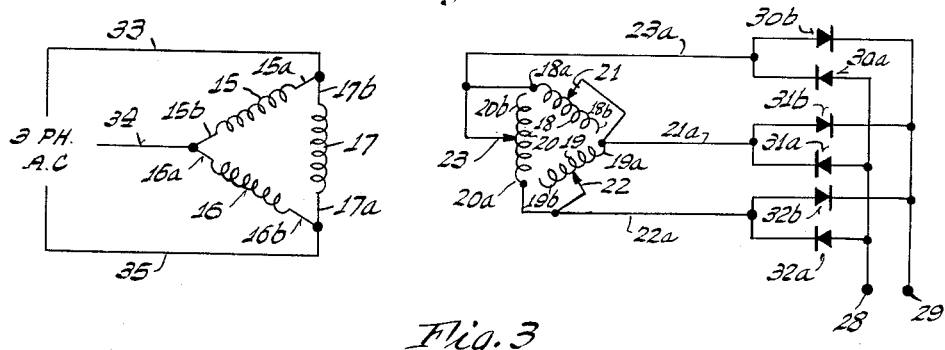
FIG. 2 is a schematic diagram of one species of the present invention in which the secondary windings are delta connected.
Figure 3:
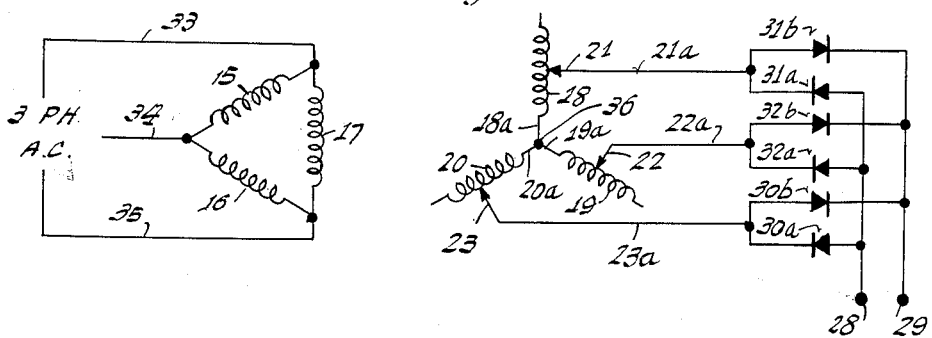
FIG. 3 is a further embodiment of the present invention in which the secondary windings are Y connected.

The parts are connected electrically, as shown in FIG. 2, with the primary windings being delta connected to a source of A.C. power as is also the case in the embodiment of the invention shown in FIG. 3. Accordingly, the primary windings 15, 16 and 17 have their ends connected to three conductors 33, 34 and 35 in a delta connection such that the ends 15a and 17b are connected to the conductor 33, the ends 15b and 16a are connected to the conductor 34 and the ends 16b and 17a are connected to the conductor 35. As indicated, the conductors 33, 34 and 35 are connected to a three phase A.C. source.

The secondary windings are delta connected in the embodiment of the invention shown in FIG. 2 and thus the end 18a of secondary winding 18 is connected to the lead 23a that is connected to the brush 23 of the winding 20, the end 19a is connected to the lead 21a which is connected to the brush 21 of the winding 18 and the end 20a is connected to the lead 22a which connects to the brush 22 of the winding 19.

As schematically shown on the drawing, the lead 23a connects to the one-way valves 30a and 30b, the lead 21a connects to the one-way valves 31a and 31b and the lead 22a connects to the one-way valves 32a and 32b. The one output terminal 29 has each of the "b" valves connected to it, i.e. 30b, 31b and 32b while the output terminal 28 has each of the "a" valves connected to it, i.e. 30a, 31a and 32a. With this construction, it will be appreciated that the terminal 29 is positive and the terminal 28 is negative because the one-way valves connected to the terminal 29 are all conductive in one direction, i.e. the forward direction of conduction, while the one-way valves connected to the terminal 28 are connected to be conductive in the opposite direction of conduction.

The above-described embodiment of the invention provides for an adjustable D.C. voltage; however, the maximum voltage obtained from this construction may be substantially doubled (with a halving of the maximum current, the maximum power output of both embodiments being approximately the same) if the secondary windings 18, 19 and 20 are connected in a Y connection. This is shown in the electrical schematical diagram of FIG. 3 of the other embodiment of the invention. The primary windings 15, 16 and 17 and their connections to the conductors 33, 34 and 35 and to the three phase A.C. source is the same as that previously described. The one-way valve means 30a through 32b are connected in the same manner and to the output terminals 28 and 29 also as that previously described. However, in this embodiment of this invention, the ends 18a, 19a and 20a of the secondary windings are all connected to a common point 36. Power is conducted from the secondary windings through the brushes 21, 22 and 23 and their associated conductors 21a, 22a and 23a respectively, to the rectifiers 30a and 30b, 31a and 31b and 32a and 32b respectively with one conductor being connected to an "a" and a "b" one-way valve.

It will thus be appreciated that the movement of the shaft 26, as by manual or otherwise rotation of the knob 27 causes movement of the brushes along their associated secondary windings to thereby enable the A.C. voltage and hence the D.C. output voltage to be adjusted within the voltage range of the adjustable rectifier.

It will accordingly be appreciated that the rectifier of the present invention, by reason of its construction and arrangement, consists of few parts yet it produces, from a three phase A.C. source, an adjustable D.C. power output that has a low ripple content and a ripple frequency which is quite high, i.e. 360 cycles if the supply frequency is 60 cycles, so that it in effect produces a substantial smooth D.C. output which in most instances will not require filtering. The range of the output voltage in one embodiment of the invention is about twice that of the other but the other, i.e. FIG. 2, has a maximum current output that is double that of the former. In both instances the maximum power output is substantially constant and it will be understood, that to change from one embodiment to the other, only a few changes in connections are required.

Figure 4:
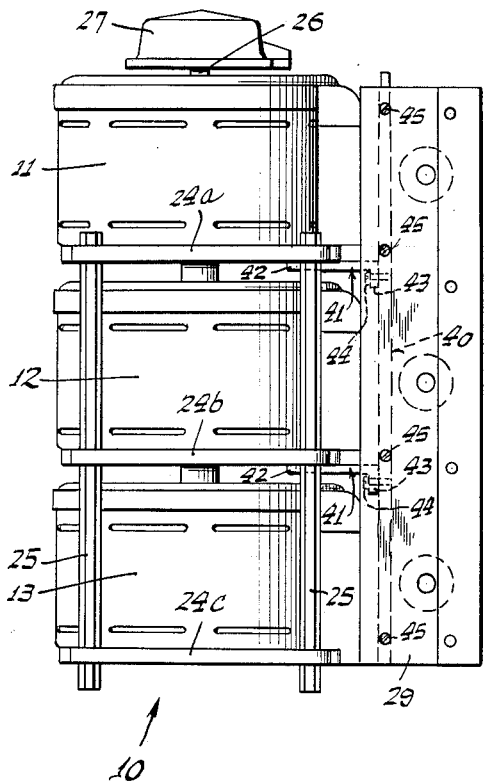
FIG. 4 is a side elevation of the adjustable voltage rectifier of the present invention of the embodiment shown in the electrical schematic diagram in FIG. 2.

The electrical components of the present invention are interconnected in a simple, effective and efficient structure constituting an important part of the present invention. As shown in FIGS. 4 and 5, the transformers 11, 12 and 13 are annular in shape and are supported to be vertically aligned. Connected in vertical alignment therewith are the terminals 28 and 29 with each terminal constituting a solid plate of electrical and heat conducting material, such as copper or aluminum. The bars are mounted to be parallel to each other in spaced relation with the one-way valves or rectifiers 30a, 31a and 32a being identical and each having a stud (as indicated by the reference numeral 37 for the valve 30a) that is threaded into threaded apertures 38 formed in the terminal plate 28 while the rectifiers 30b, 31b and 32b are of identical external design to have their studs threaded into the terminal plate 29. This positions the rectifiers closely adjacent the terminals to which their flexible leads (as indicated by the reference numeral 39 for the one-way valve 30a) are connected. Thus the terminal plates 28 and 29 not only serve to conduct current from the threaded studs of the one-way valves but also serve as a "heat sink" to conduct heat away from the one-way valve means. Moreover, the employment of the space bars provides an enclosure in which the one-way valves and the wiring of the adjustable voltage rectifier may be positioned.

The one-way valves having the postscript "a" are of the type that are normally conductive from the threaded stud to their flexible lead while the one-way valves having the postscript "b" are conductive from the flexible lead to the threaded stud and hence the latter one-way valves are electrically complementary to the first even though they have the same appearance.

To secure the plates 28 and 29 to the transformers there is provided a panel 40 of insulating material that is secured to the transformers by L-shaped members 41, one leg 42 of each of the members being secured as by welding to the bases 24a and 24b while its other leg 43 is secured as by screws 44 to the panel. Screws 45 secure the terminal plates 28 and 29 to the panel. If desired, a protective enclosure may enclose the terminal plates. As shown, to facilitate connection to the terminal plates, a threaded member 46 having a nut is secured to each of the plates 28 and 29.

Variations and modifications may be made within the scope of the claims and portions of the improvements may be used without others.

I claim:
1. An adjustable voltage rectifier comprising a plurality of adjustable transformers, each transformer having a paramagnetic core, a primary winding wound thereon, a secondary winding wound thereon, a brush movable on the secondary winding in electrical engagement continuously with at least one turn thereof, and means for moving the brush; means interconnecting the brush moving means of each of the transformers to cause them to move in unison when moved; means for connecting the primary windings to a multiple phase source of A.C. with each primary winding being energized from one of the phases; a pair of D.C. output terminals with each terminal being a plate formed of conducting material and having apertures formed therein; a first group of one-way valve means conductive in the same direction connected to one plate by each one-way valve means having a stud positioned in an aperture to be in electrical and heat conductive relation to the plate; a second group of one-way valve means connected to the other plate by each one-way valve means having a stud positioned in an aperture to be in electrical and heat conductive relation to the plate with each of the one-way valve means in the second group all being conductive in the same direction but reversed from the conductive direction of the first group; and means connecting the brushes of the transformers to the one-way valve means with each brush being connected to one one-way valve means in each group whereby movement of the brushes in unison provides an adjustable D.C. voltage at the output terminal, said transformers being mounted to be vertically aligned with the plates supported thereon to extend vertically in parallel spaced relation and having the one-way valve means positioned between the plates.

2. The invention as defined in claim 1 in which there are as many one-way valve means connected to one terminal as there are connected to the other terminal.

3. An adjustable voltage rectifier comprising three adjustable transformers, each transformer having a paramagnetic core, a primary winding wound thereon, a secondary winding wound thereon, a brush movable on the secondary winding in electrical engagement continuously with at least one turn thereof, and means for moving the brush; means interconnecting the brush moving means of each of the transformers to cause them to move in unison when moved; means for connecting the primary windings to a three phase source of A.C. with each primary winding being energized from one of the phases; a pair of D.C. ouput terminals with each terminal being a plate formed of conducting material and having apertures formed therein; a first group of three one-way valve means conductive in the same direction connected to one plate by each one-way valve means having a stud positioned in an aperture to be in electrical and heat conductive relation to the plate; a second group of three one-way valve means connected to the other plate; and means connecting the brushes of the transformers to the one-way valve means with each brush being connected to one of each of the valve means whereby movement of the brushes in unison provides an adjustable D.C. voltage at the output terminal, said transformers being mounted to be vertically aligned with the plates supported thereon to extend vertically in parallel spaced relation and having the one-way valve means positioned between the plates.

4. The invention as defined in claim 3 in which one end of each of the secondary windings is connected to a common point to Y connect the secondary windings.

5. The invention as defined in claim 3 in which an end of one secondary winding is connected to the brush of another secondary winding with each brush having only one end of a secondary winding connected thereto to delta connect the secondary windings.

References Cited in the file of this patent
UNITED STATES PATENTS

| | | |
|---|---|---|
| 1,110,590 | Thomas | Sept. 15, 1914 |
| 2,175,841 | Kafka et al. | Oct. 10, 1939 |
| 2,617,978 | Matthews | Nov. 11, 1952 |
| 2,859,398 | Johnson et al. | Nov. 4, 1958 |
| 2,866,147 | Bichsel | Dec. 23, 1958 |
| 2,886,747 | Diebold | May 12, 1959 |